United States Patent [19]

Tanioka

[11] Patent Number: 4,723,173
[45] Date of Patent: Feb. 2, 1988

[54] IMAGE PROCESSING APPARATUS
[75] Inventor: Hiroshi Tanioka, Tokyo, Japan
[73] Assignee: Canon Kabushiki Kaisha, Tokyo, Japan
[21] Appl. No.: 73,339
[22] Filed: Jul. 13, 1987

Related U.S. Application Data

[63] Continuation of Ser. No. 737,664, May 24, 1985, abandoned.

[30] Foreign Application Priority Data

May 31, 1984 [JP] Japan ................................. 59-109343
Dec. 28, 1984 [JP] Japan ................................. 59-276495

[51] Int. Cl.⁴ ............................................. H04N 1/40
[52] U.S. Cl. .................................... 358/282; 358/283
[58] Field of Search ................................ 358/282, 283

[56] References Cited

U.S. PATENT DOCUMENTS 3,466,603  9/1969  Shelton ............................... 358/282
4,251,837  2/1981  Janeway ............................. 358/283
4,414,581  11/1983 Kato et al. ......................... 358/280
4,447,830  5/1984  Stoffel .............................. 358/283
4,549,220  10/1985 Suzuki .............................. 358/283
4,554,594  11/1985 Ciardiello ......................... 358/282
4,575,768  3/1986  Sakai ............................... 358/282
4,578,711  3/1986  White ............................... 358/282

FOREIGN PATENT DOCUMENTS 59-218076 12/1984 Japan .

Primary Examiner—Howard W. Britton
Attorney, Agent, or Firm—Fitzpatrick, Cella, Harper & Scinto

[57] ABSTRACT

Image processing apparatus comprises a first processor for binarizing an input image data with a first threshold level, a second processor for binarizing the input image data with a second threshold level, and a selector for discriminating an image tone of the input image data and selecting one of the first and second processors in accordance with a discrimination result.

14 Claims, 8 Drawing Figures

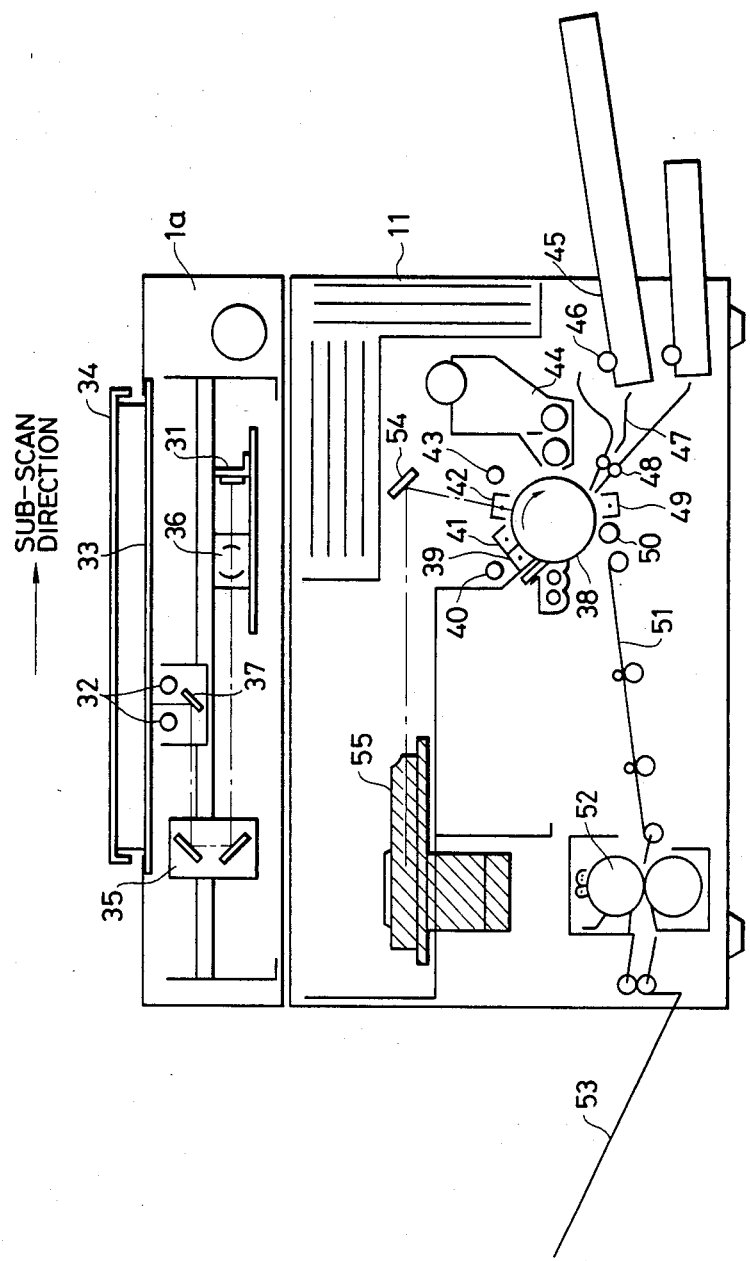

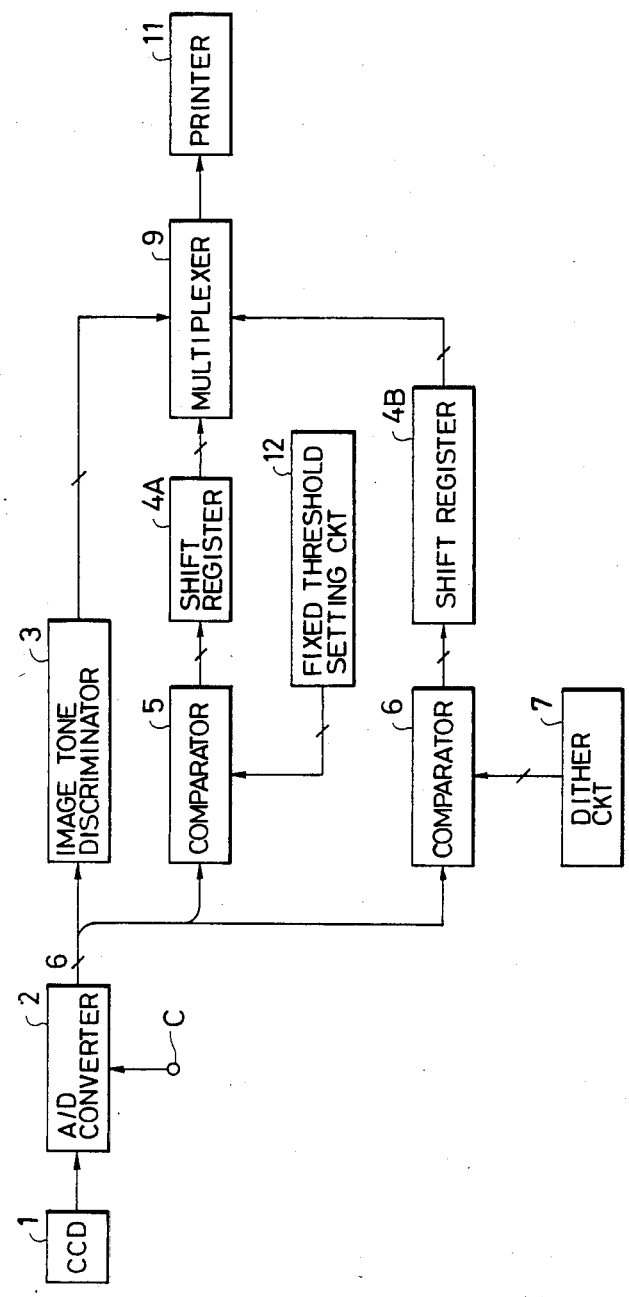

IMAGE PROCESSING APPARATUS

This application is a continuation of application Ser. No. 737,664, filed 5/24/85, now abandoned.

BACKGROUND OF THE INVENTION

1. Field of the Invention

The present invention relates to an image processing apparatus suitable for an electronic file, facsimile, reader or digital copier.

2. Description of the Prior Art

In a prior art apparatus which uses a solid-state image pick-up device such as a CCD to read pixel density of an image to reproduce the image, a function of background elimination in which background color of a document (for example, a newspaper) is not reproduced but only characters are sharply reproduced may be equipped to impart intelligency.

The methods for doing so are classified as follows:

1 The background color is sequentially detected and a binarization threshold is set to be higher than the background density.

2 An entire area of the document is read in advance, the background color level is detected from a density histogram and the binarization threshold is set accordingly. In the method 1, it is difficult to follow an abrupt change in the image density and a portion of character information is dropped or the background color is partially reproduced. Thus, it allows real-time processing but accuracy is low.

On the other hand, the latter or pre-scan method 2 allows high accuracy processing because it can correctly detect the background color. However, since the document has to be read twice, a double length of time is required and this method is not suitable to a high speed apparatus. In addition, the apparatus is complex because it must prepare the density histogram of the entire document.

SUMMARY OF THE INVENTION

It is an object of the present invention to provide an image processing apparatus which presents a high quality of reproduced image.

It is another object of the present invention to provide an image processing apparatus which performs background elimination function with high accuracy in real time.

It is another object of the present invention to provide an image processing apparatus having an image discrimination function.

It is another object of the present invention to provide an image processing apparatus capable of presenting an excellent reproduced image with a simple construction.

It is still another object of the present invention to provide an image processing apparatus having an image discrimination function for images whose background colors are to be eliminated.

Other objects features and advantages of the present invention will be apparent from the following description of the invention.

BRIEF DESCRIPTION OF THE DRAWINGS

FIG. 7 is a sectional view of a reader and a printer, and FIG. 8 illustrates a second embodiment.

DETAILED DESCRIPTION OF THE PREFERRED EMBODIMENTS

The binarization processing by a constant threshold is first explained.

Figure 1:
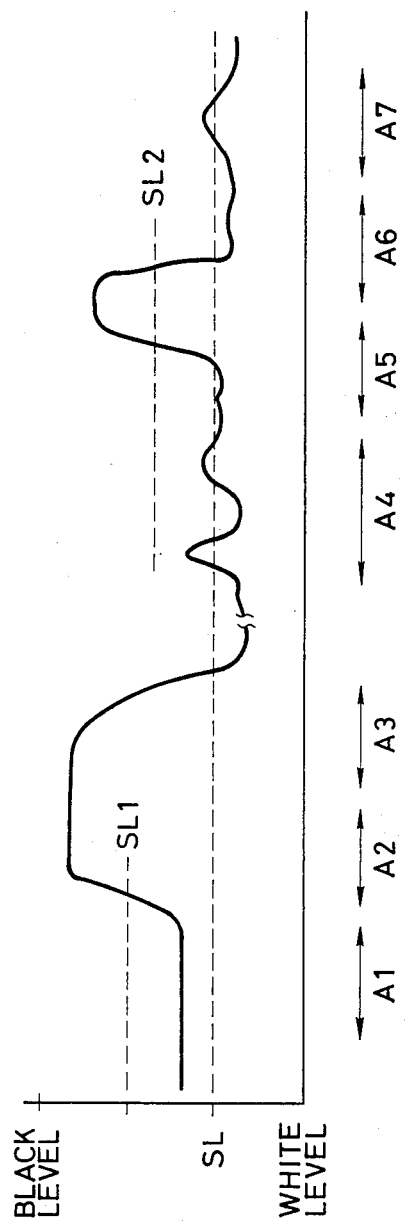
FIG. 1 shows a density curve of a document having a colored background.

FIG. 1 shows a density curve of a document having a colored background, and unit image areas A1 to A7 represent character areas and background areas. For example, A1 represents a uniform colored background such as that of a newspaper, and A2 and A3 represent character areas. A4 to A7 represent a blue copy document (e.g., one made by diazo type copier). A4 and A7 represent colored background and characters are at a boundary of A5 and A6.

If the image is binarized by a slice level SL shown in FIG. 1, the background is determined as black and the characters cannot be identified, in the areas A1 to A3. In the areas A4 to A7, the characters are reproduced but a portion of the background is also reproduced in dots. Thus, a noisy image is reproduced.

In a prior art system, the threshold is set to a slice level SL1 in the areas A1 to A3 and to a slice level SL2 in the areas A4 to A7 to prevent the background from being reproduced. In the present embodiment, noting the fact that the background area is a gray level area having only a small density change variation within it, the image is divided in character areas and gray level areas, and a binarization threshold for the gray level areas is set to be higher (closer to a black level) than that of the character areas so that the background is eliminated in the reproduced image.

The threshold for the gray level areas should be higher than a maximum density of an ordinary colored background document and lower than an ordinary character density. A large character includes a gray level area having a high density and a small density change. Accordingly, if the above determination is done for each 4×4-pixel block, it may be identified as a gray area. Thus, in the present embodiment, the threshold for the gray level areas is set to 40 (where white level is 0 and black level is 63), which value was experimentally derived to prevent line images such as characters from being binarized to white.

The threshold need not be constant in the 4×4-pixel unit area: the area may be dither-processed (gray level G half-tone processing) to have an average of approximately 40. By setting the threshold to 32–47, the character areas can be reproduced and gray levels and the background can be eliminated.

The threshold to binarize the line image such as characters is usually set to a relatively low level in order to prevent drop-out of the characters and to sharply reproduce the characters. If this low level threshold only is used to eliminate the background of the document containing the characters, the background elimination is not perfect, and in some cases the background partially appears black and the characters or the document cannot be sharply reproduced.

In the present embodiment, a relatively low threshold is set for the character areas to sharply reproduce the characters, and a higher threshold is set for the background area to eliminate the background.

Figure 2:
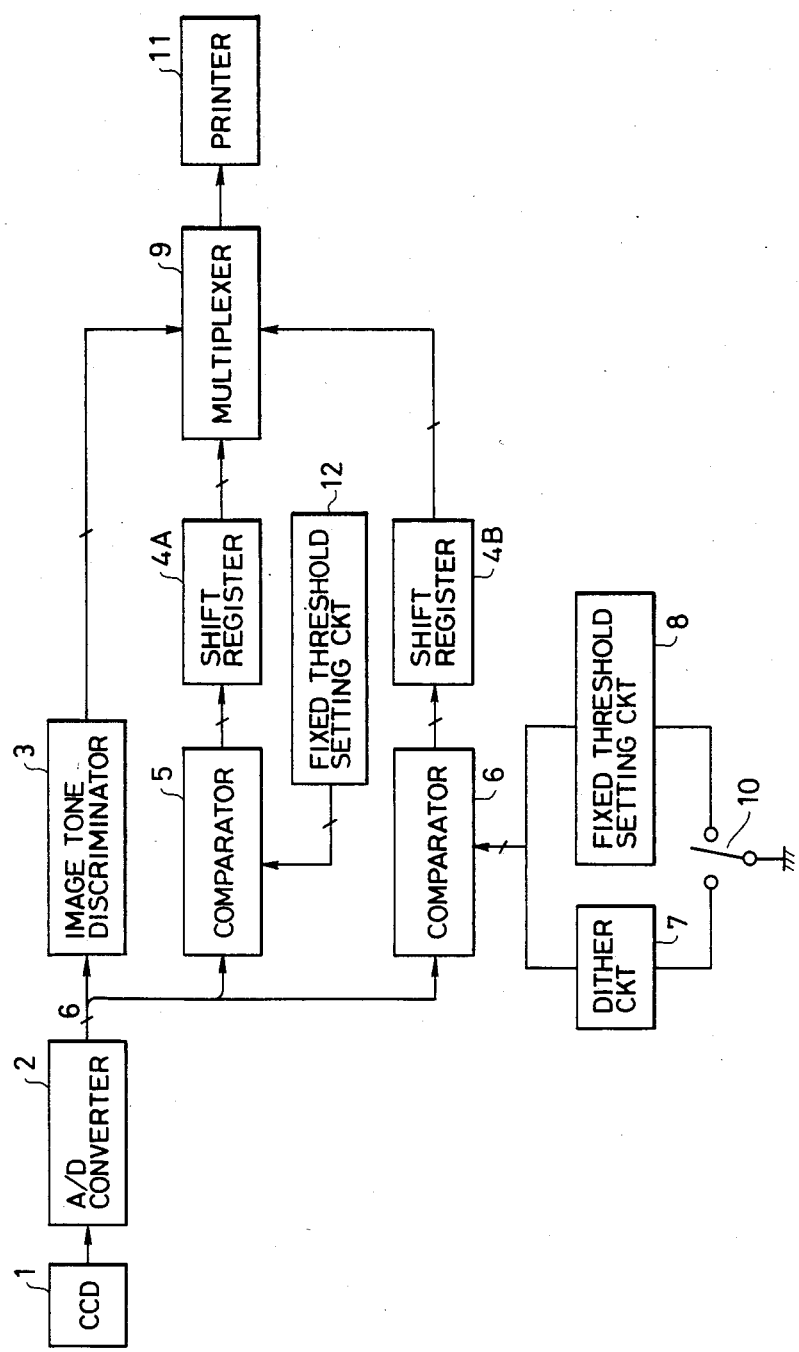
FIG. 2 is a circuit diagram of one embodiment of an image processing apparatus of the present invention.

FIG. 2 shows a circuit diagram of one embodiment of the image processing apparatus of the present invention. Numeral 1 denotes a solid-state image pick-up device such as a CCD, which reads an image on a document and converts it to a video signal, numeral 2 denotes an A/D converter which converts an analog video signal to a digital signal, and numeral 3 denotes an image tone discrimination circuit which discriminates an image tone (a characteristic or property of an image) for each 4×4-pixel block, as shown in Japanese Patent Application Ser. No. 92074/1983. An output of the image tone discriminator (which is "1" when a character area is discriminated and "0" when a gray level area is discriminated) is supplied to a multiplexer 9 which selects a corresponding binary video signal 1 (to be described later) and sends it to a image reproducer (printer) 11.

On the other hand, comparators 5 and 6 compare the output of the A/D converter 2 with predetermined binarization thersholds and produce an output "1" if the video signal is larger than the threshold to allow dot printing and produce an output "0" if the video signal is not larger than the threshold. The output of the image tone discrimination circuit 3 and the binary video signal are synchronized by shift registers 4A and 4B.

By the arrangement shown in FIG. 2, the image is discriminated and processed for each block on a real time basis.

A fixed threshold of 25 is set to the comparator 5 from a fixed threshold setting circuit 12 in order to binarize the character areas, and a threshold is selectively set to the comparator 6 by a dither circuit 7 or a fixed threshold setting circuit 8 in order to binarize the image in the gray level area. When the dither circuit 7 is selected, 64 or 16-step gray levels are reproduced by the dither circuit in accordance with the document density in the gray level area, and when the fixed threshold setting circuit 8 is selected, the gray level area (background of the document) is eliminated and only the characters are reproduced on a white background. The threshold from the fixed threshold setting circuit 8 is higher than the threshold from the fixed threshold setting circuit 12, as described above.

A switch 10 is an operation key arranged on a console unit. An operator can select the threshold depending on whether the document is a character document or a character/photograph document. For the character document, the fixed threshold setting circuit 8 is selected, and for the character/photograph document, the dither circuit 7 is selected.

The image tone discrimination circuit 3 may utilize a density difference in the unit block or a space frequency, or any other method which allows separation of the character area and the gray level area. The image may be discriminated for each block or for each pixel.

Figure 3:
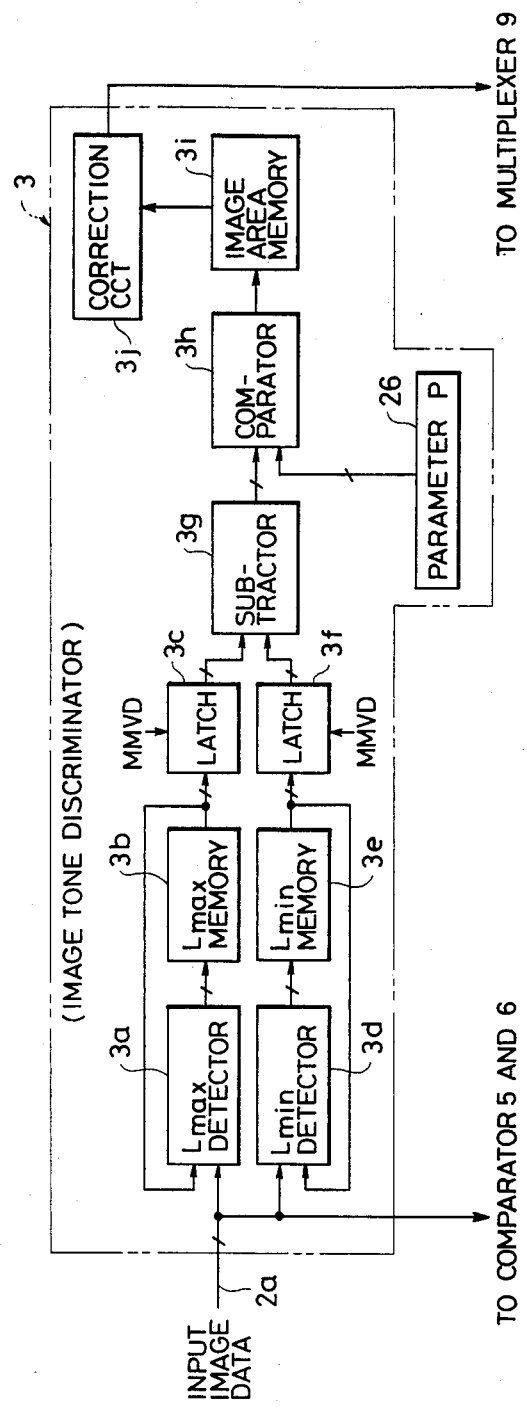
FIG. 3 shows a detail of an image discrimination circuit.

FIG. 3 shows a detail of the image tone discrimination circuit. Numeral 2a denotes a video data signal which has been converted to the digital signal by the A/D converter 2 and is a 6-bit parallel signal, numeral 3a denotes a MAX detector for detecting a maximum pixel density (L max) for each block, and numeral 3b denotes a MAX memory which stores therein an output from the MAX detector. It can store a 6-bit density level information for each of the blocks which are equal in number to one quarter of the number of pixels in one main scan line. An output of the MAX memory 3b is fed back to an input of the MAX detector 3a to allow comparison of L max in the corresponding block of the preceding main scan line with the pixel density of the current main scan line. The output of the MAX memory 3b is also supplied to a subtractor 3g through a latch 3c. Numeral 3d denotes a MIN detector for detecting a minimum pixel density (L min) for each block, and numeral 3e denotes a MIN memory which stores therein an output from the MIN detector 3d. An output of the MIN memory 3e is supplied to a latch 3f and fed back to the input of the MIN detector 3d to allow comparison of L min in the corresponding block of the preceding main scan line with the pixel density of the current main scan line. Subtractor 3g calculates a difference between the output L max of the latch 3c and the output L min of the latch 3f, that is, (L max-L min), and numeral 3h denotes a comparator for comparing the output (L max-L min) of the subtractor 3g with a predetermined image tone discrimination parameter P. The output of the comparator 3h is stored in an image area memory 3i. The image tone discrimination parameter P is supplied from a parameter circuit 26. Numeral 3j denotes a correction circuit for correcting the output of the image area memory 3i. The image tone discrmination circuit 3 comprises those elements.

The operation of the image processing apparatus is now explained. If the reader (CCD 1 and A/D converter 2) main-scans and sub-scans the document to read it in 64 levels, a 6-bit video data is produced for each pixel and the reader produces the video data signal which is a 6-bit parallel signal. The image tone discrimination circuit 3 divides the image into 4×4-pixel blocks, detects L max and L min for each block, calculates (L max-L min) and compares (L max-L min) with the image tone discrimination parameter P to separate the line image areas such as character areas from the gray level areas.

If (L max-L min)≧P, a line image area is discriminated, and if (L max-L min)<P, a gray level area is discriminated. The result is stored in the memory in the image tone discrimination circuit 3. The line image area is represented by "1" and the gray level area is represented by "0".

The binary data is delayed in the shift registers 4A and 4B by a time equal to that needed for processing in the image tone discrimination circuit 3. When the output of the image tone discrimination circuit 3 is "1", the binary data of the shift register 4A is selected by the multiplexer 9, and when the output of the image tone discrimination circuit 3 is "0", the binary data of the shift register 4B is selected. In the video signal thus obtained, either binarized or dither-processed image data appears for each 4-pixel block in the main scan direction. The binary data from the multiplexer 9 is supplied to the printer 11 which can be such as a laser beam printer, which reproduces an image on a record paper.

Figure 4:
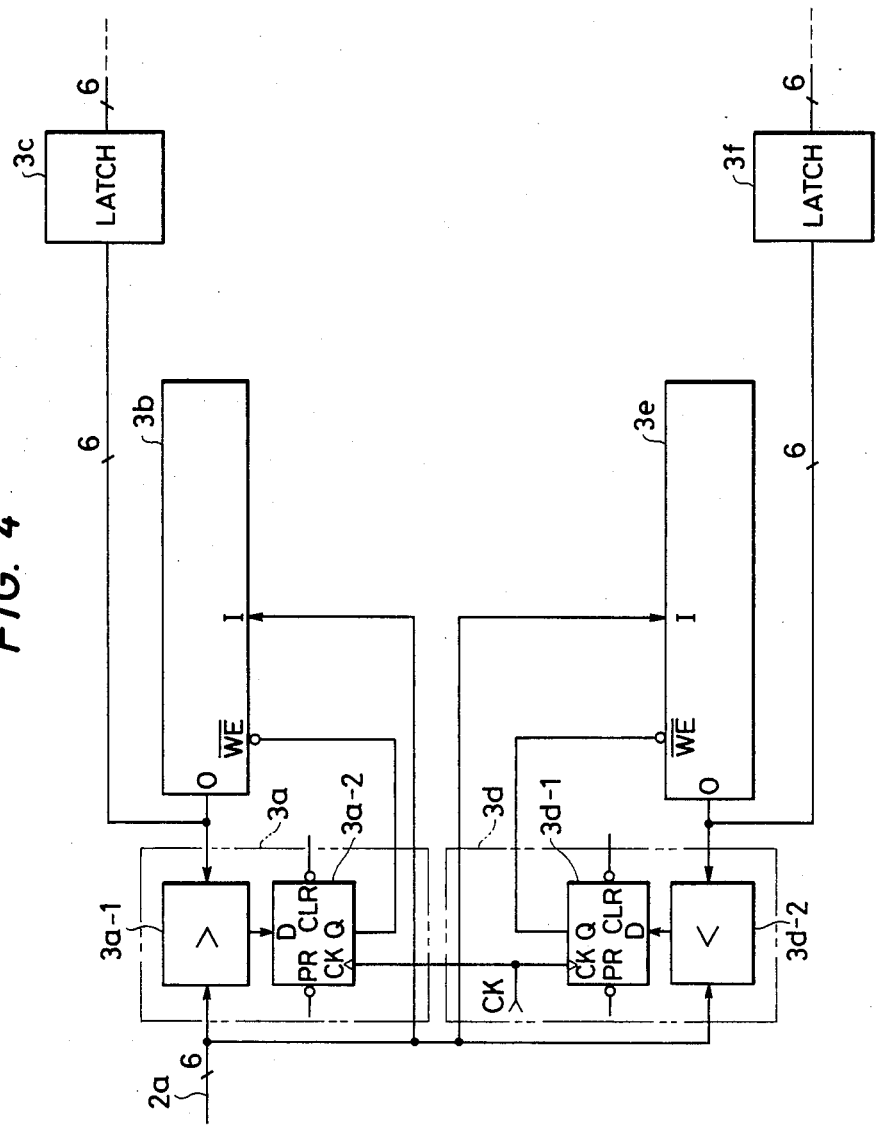
FIG. 4 shows a detail of a MAX detector 3a, a MAX memory 3b, a MIN detector 3d and MIN memory 3e.

FIG. 4 shows a detail of the MAX detector 3a, MAX memory 3b, MIN detector 3d and MIN memory 3e. Numerals 3a-1 and 3d-1 denote comparators and numerals 3a-2 and 3d-2 denote flip-flops (F/F). The RAM 3b, comparator 3a-1 and F/F 3a-2 divide the 4-bit serial image density data 2a to 4×4-pixel unit blocks and detect the maximum pixel density L max for each unit block.

Figure 5:
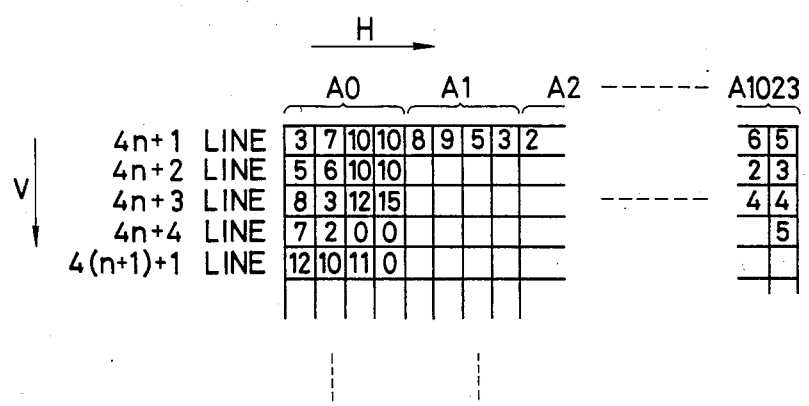
FIG. 5 shows pixel densities of a document.
Figure 6:
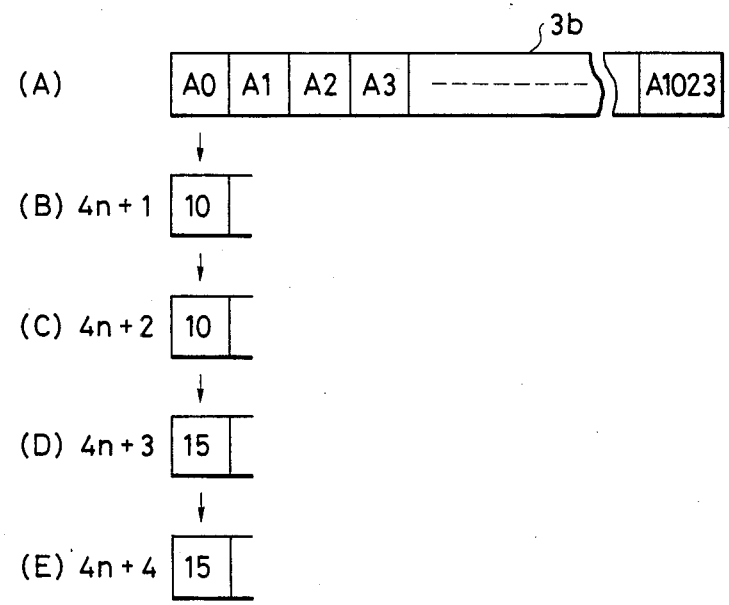
FIG. 6 shows areas of the MAX memory 3b.

The detection of L max is explained with reference to FIGS. 5 and 6. FIG. 5 shows image densities read by the solid-state image pick-up device such as a CCD, converted to a digital signal by the A/D converter 2 and arranged to correspond to the original document. FIG. 6 shows memory areas of the MAX memory as shown in Fig-6(A), the MAX memory 3b has a space to store 4-pixel data of the image read at 16 pixels/mm in the main scan direction from the document having a length of 256 mm in the main scan direction, that is, data corresponding to image areas A0 to A1023.

In FIG. 5, arrows H and V indicate the main scan direction and the sub-scan direction of the document. A0, A1, . . . are unit blocks (image areas each having 4×4=16 pixels).

Let us assume that when the CCD main-scans the (4n+1) th line, the image data 2

$$3 \to 7 \to 10 \to 10 \to 8 \to 0 \to$$

are sequentially supplied to the comparator 3a-1 and the MAX memory 3b in synchronism with a main scan clock CK. The comparator 3a-1 sequentially compares the serially supplied image data with the data stored in the MAX memory 3b, and if the supplied pixel density is higher, the output of the comparator 3a-1 is held in the F/F 3a-2 and the MAX memory 3b is set to a write mode.

When the first data of the (4n+1)th line is supplied to the comparator 3a-1, it is unconditionally written into the MAX memory 3b as an initial value in the image area in which that data is included. In FIG. 5, the density data "3" is the initial value in the image area A0, and the data "8" is the initial value in the image area A1.

In the image area A0 when the next data "7" of the (n+1)th line is supplied to the comparator 3a-1, the initial value "3" stored in the MAX memory 3b is read and both data values are compared. Since 7>3, the content of the MAX memory 3b is changed from "3" to "7".

Similarly, when the next data values "10" is supplied, the content of the MAX memory 3b is again updated, and at the end of the transfer of the four-pixel data contained in the image area A0 of the (4n+1)th line, the maximum data "10" of the four pixels is stored at the address of the memory area of the MAX memory 3b corresponding to the image area A0.

At the end of the scan of the image area A1 on the (4n+1)th line, the maximum data "9" is stored. The above steps are repeated by 1024 times, for example, to all image areas on the (4n+1)th line, and at the end of the steps, 1024 data are stored at the address of the MAX memory 3b as the maximum data L max of the image areas on the (4n+1)th line.

During the scan of the (4n+2)th line, the image data are sequentially compared with the maximum data of the corresponding image areas on the (4n+1)th line. Accordingly, at the end of the processing of the (4n+2)th line, the data value "10" is stored in the area of the MAX memory 3b for the image area A0 as the maximum data, as shown in FIG. 6(c).

Similarly, at the ends of the processing of the (4n+3)th and (4n+4)th line, the data "15" is stored as shown in FIGS. 6(D) and 6(E).

In the processing of the next {4(n+1)+1}th line, the data "15" is read from the MAX memory 3b as the maximum value L max for the image area A0 before the initial value "12" is written into the same address of the MAX memory 3b, and it is supplied to the subtractor 3g through the latch 3c.

The MIN memory 3e, comparator 3d-2 and F/F 3d-1 detect the minimum pixel density L min in the image area in the same manner as the MAX memory 3b, comparator 3a-1 and F/F 3a-2 detect the maximum density L max.

FIG. 7 shows a digital copier to which the present invention is applied. It shows a sectional view of the reader 1a and the printer 11 shown in FIG. 2. The document is placed face-down on a document glass 33 (a mounting refererence is at the left inner side as viewed from the front). The document is pressed against the document glass 33 by a document cover and is illuminated by a fluorescent lamp 32 and a light reflected therefrom is condensed to a CCD 31 through mirrors 35 and 37 and a lens 36. The mirrors 37 and 35 are moved at velocity ratio of 2. The optical unit is moved from left to right at a constant velocity under a PLL control by a DC servo motor. The velocity is 180 mm/sec in a forward run in which the document is illuminated, and 468 mm/sec in a return run.

The printer unit 11 below the reader unit 1a in FIG. 7 is now explained. The bit-serial image signal processed in the circuit shown in FIG. 2 is supplied to a laser scan optical unit 55 of the printer. This unit comprises a semiconductor laser, collimator lens, rotating polygon mirror, F-a lens and correction optical system. The image signal from the reader is applied to the semiconductor laser where it is electro-optically converted to a laser beam, which is collimated by a collimator lens, and the collimated light is directed to the rotating polygon mirror so that the laser beam scans the photoconductor 38. The polygon mirror is rotated at 2,600 r.p.m.

The laser beam from the unit is directed to the photoconductor 38 through the mirror 54. The photoconductor 38 may comprise three layers, a conductive layer, a photoconductor layer and an insulation layer. Process components for forming the image are arranged around the photoconductor 38. Numeral 39 denotes a pre-discharger, numeral 40 denotes a pre-discharge lamp, numeral 41 denotes a primary charger, numeral 42 denotes a secondary charger, numeral 43 denotes an exposure lamp, numeral 44 denotes a developing unit, numeral 47 denotes a paper feed guide, numeral 48 denotes a regist roller, numeral 49 denotes a transfer charger, numeral 50 denotes a separation roller, numeral 51 denotes a convey guide, numeral 52 denotes a fixer and numeral 53 denotes a tray.

The operation of those process components has been well known and hence detailed explanation thereof is omitted.

In the present embodiment, the input image data are binarized by the comparators. Alternatively, they may be binarized by a memory addressed by the input image data. The same is true for the dither processing. The image tone discrimination method is not limited to those shown in FIGS. 4 to 6 but other methods may be used.

Referring to FIG. 8, a second embodiment is explained. The like elements to those shown in FIG. 2 are designated by the like numerals. In the present embodiment, a control signal is applied from a terminal C to the A/D converter 2. The A/D converter 2 switches an A/D conversion range of the video signal in accordance with the control signal. The control signal may be supplied from an operation key (not shown) arranged on a console (not shown). When a document having a light background is to be reproduced, an operator depresses the operation key. As a result, the control signal is produced and the A/D conversion range of the A/D converter 2 is switched so that the digital video signal without the background component is produced. In this manner, the image with the background eliminated is reproduced on a real time basis.

As described above, according to the present invention, the level of the background of the conventional image is experimentally picked to set a fixed threshold used to binarize only the gray level image area (background area) Accordingly, the hardware scale is very small and yet the background processing is sufficiently practical.

When the gray level in the background is to be reproduced, the threshold is dither-processed. Thus, the characters are sharply reproduced and the gray level area is correctly reproduced in accordance with the original document.

The present invention is not limited to the illustrated embodiments but various modifications may be made within the scope of the claim.

I claim:

1. An image processing apparatus comprising:
   image data input means for inputting image data;
   first processing means for binarizing the image data input from said image data input means with a first fixed threshold level to produce a first binary signal;
   second processing means for binarizing the image data input from said image data input means to produce a second binary signal, said second processing means including a first processing mode for binarizing the input image data with a second fixed threshold level different from the first fixed threshold level and a second processing mode for halftone processing the input image data;
   select means for selecting the first mode or the second mode; and
   discriminating means for discriminating an image tone of the input image data and selecting the first binary signal produced from said first processing means or the second binary signal produced from said second processing means, in accordance with the processing mode selected by said select means in accordance with the discrimination result.

2. An imare processing apparatus according to claim 1, wherein said discriminating means discriminates whether the input image data represents a halftone image or a non-halftone image.

3. An image processing apparatus according to claim 1, wherein said select means includes an operation key actuated by an operator.

4. An image processing apparatus according to claim 1, wherein said second fixed threshold level is higher than said first fixed threshold level.

5. An image processing apparatus according to claim 1, wherein said second processing means includes a fixed threshold generation circuit for generating the second fixed threshold level and a dither threshold generation circuit for generating a dither threshold level, and said select means selects said fixed threshold generation circuit or said dither threshold generation circuit.

6. An image processing apparatus according to claim 1, wherein said first and second processing means include memory means for storing binarized data.

7. An image processing apparatus comprising:
   image data input means for inputting image data;
   first processing means for processing the image data input from said image data input means to produce a first reproduction signal;
   second processing means for processing the image data input from said image data input means to produce a second reproduction signal, said second processing means including a first processing mode for halftone processing the input image data and a second processing mode for non-halftone processing the input image data;
   mode select means for selecting the first processing mode or the second processing mode; and
   reproduction signal select means for selecting the first reproduction signal produced from said first processing means or the second reproduction signal produced from said second processing means, in accordance with the processing mode selected by said mode select means, in response to an input instruction signal.

8. An image processing apparatus according to claim 7, wherein said mode select means includes an operation key actuated by an operator.

9. An image processing apparatus according to claim 8, further comprising discriminating means for discriminating an image tone of the input image data, said discriminating means generating the instruction signal in accordance with the discrimination result.

10. An image processing apparatus according to claim 9, wherein said discriminating means discriminates whether the input image data represents a halftone image or a non-halftone image.

11. An image processing apparatus according to claim 7, wherein said first processing means processes the input image data with a first fixed threshold level to produce a first binary signal.

12. An image processing apparatus according to claim 11, wherein said second processing mode is adapted to process the input image data with a second fixed threshold level different from the first fixed threshold level.

13. An image processing apparatus according to claim 12, wherein said second processing means processes the input image data to produce a second binary signal, and said first processing mode is adapted the input image data with a dither threshold level to produce the second binary signal.

14. An image processing apparatus according to claim 13, wherein said second fixed threshold level is higher than said first threshold level.

* * * * *

UNITED STATES PATENT AND TRADEMARK OFFICE
CERTIFICATE OF CORRECTION

PATENT NO. : 4,723,173  Page 1 of 3
DATED : February 2, 1988
INVENTOR(S) : HIROSHI TANIOKA It is certified that error appears in the above-identified patent and that said Letters Patent is hereby corrected as shown below:

COLUMN 1

Line 19, "intelligency." should read --intelligibility--.
Line 21, "1" should read -- ① --.
Line 24, "2" should read -- ② --.
Line 27, "method 1," should read --method ①,--.
Line 32, "method 2" should read --method ②--.
Line 33, "high accuracy" should read --high-accuracy--.
Line 60, "objects" should read --objects,--.

COLUMN 2

Line 35, "change variation" should read --change, or variation,--.

COLUMN 3

Line 20, "a" should read --an--.
Line 23, "thersholds" should read --thresholds--.
Line 30, "real" should read --real---.
Line 67, "blocks" should read --blocks,--.

COLUMN 4

Line 6, "subtractor 3g" should read --subtracter 3g--.
Line 15, "Subtractor 3g" should read --Subtracter 3g--.
Line 19, "subtractor 3g" should read --subtracter 3g--.
Line 56, "printer 11" should read --printer 11,--.

UNITED STATES PATENT AND TRADEMARK OFFICE
CERTIFICATE OF CORRECTION

PATENT NO. : 4,723,173
DATED : February 2, 1988
INVENTOR(S) : HIROSHI TANIOKA

It is certified that error appears in the above-identified patent and that said Letters Patent is hereby corrected as shown below:

COLUMN 5

Line 4, "memory as" should read --memory 3b. As--.
Line 15, "image data 2" should read -- image data--.
Line 17, "3→ 7→ 10→ 10→ 8→ 0→ " should read --3→ 7→ 10→ 10→ 8→ 9→ --.
Line 39, "values" should read --value--.
Line 59, "FIG. 6(c)." should read --FIG. 6(C).--.
Line 67, "subtractor 3g" should read --subtracter 3g--.

COLUMN 6

Line 12, "cover" should read --cover 34--.
Line 26, "F-a lens" should read --F-θ lens--.
Line 43, "regist" should read --register--.

COLUMN 7

Line 4, "real time" should read --real-time--.
Line 9, "area)" should read --area).--.
Line 19, "claim." should read --claims.--.
Line 44, "imare" should read --image--.

UNITED STATES PATENT AND TRADEMARK OFFICE
CERTIFICATE OF CORRECTION

PATENT NO. : 4,723,173                 Page 3 of 3

DATED : February 2, 1988

INVENTOR(S) : HIROSHI TANIOKA

It is certified that error appears in the above-identified patent and that said Letters Patent is hereby corrected as shown below:

COLUMN 8

Line 52, "adapted the" should read --adapted to process the--.

Signed and Sealed this

Twenty-fourth Day of January, 1989

Attest:

DONALD J. QUIGG

*Attesting Officer*            *Commissioner of Patents and Trademarks*